Aug. 9, 1927.
H. M. DADOURIAN
SPECTACLE CASE
Filed July 24, 1925
1,638,727
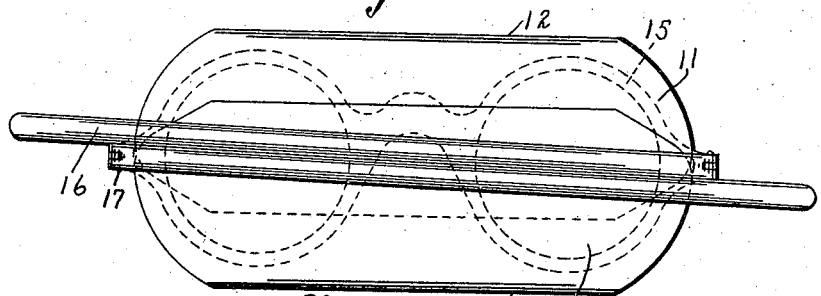
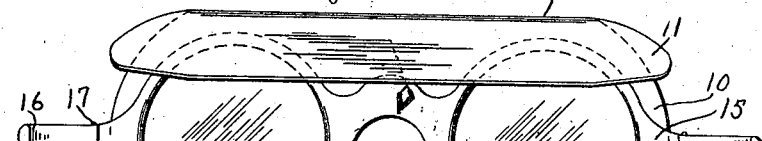
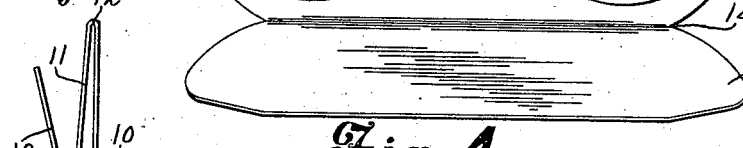
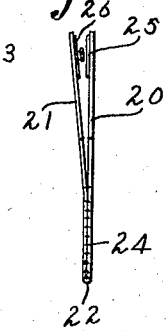
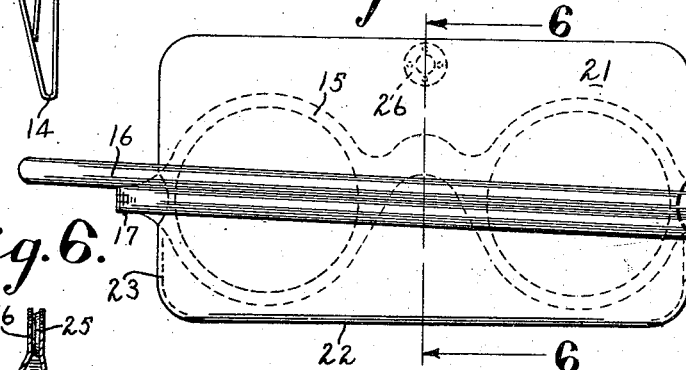
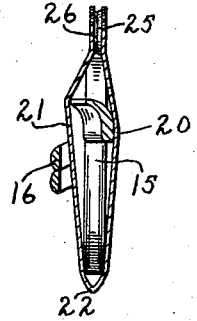
Inventor
Haroutune M. Dadourian
By Henry E. Rockwell
Attorney Patented Aug. 9, 1927.

1,638,727

UNITED STATES PATENT OFFICE.

HAROUTUNE M. DADOURIAN, OF HARTFORD, CONNECTICUT.

SPECTACLE CASE.

Application filed July 24, 1925. Serial No. 45,865.

This invention relates to spectacle cases, and more particularly to a case designed to embrace and protect the lenses of a pair of spectacles or glasses so arranged that the bows of the spectacles may project through end openings in the case so that the latter is relatively small and compact and takes up very little space in the pocket. As a result, a pair of spectacles may be enclosed in my improved case and carried in the vest pocket, for instance, whereas with the ordinary cases and particularly those adapted for bowed spectacles wherein the bows are enclosed, the cases are quite bulky and usually reinforced so that the walls of the case are relatively stiff and require a relatively large pocket for their reception.

One object of my invention, therefore, is to provide a small and compact case requiring very little space, but which will at the same time give adequate protection to the lenses.

Another object of my invention is the provision of a case for bowed spectacles which may be small and compact, and to which sufficient rigidity may be imparted by the bows themselves, which are adapted to be folded over the outside of the case.

To these and other ends the invention consists in the novel features and combination of parts to be hereinafter described and claimed.

In the accompanying drawings:

Fig. 1 is a front elevational view of a spectacle case embodying my improvements, showing a pair of spectacles enclosed therein;

Fig. 2 is a view of the case shown in Fig. 1 in open position;

Fig. 3 is an end view of the case when empty;

Fig. 4 is a view similar to Fig. 1, showing a modified form of my invention;

Fig. 5 is an end view of the case shown in Fig. 4, and,

Fig. 6 is a sectional view on line 6—6 of Fig. 4.

The embodiment of my invention which I have illustrated in Figs. 1 to 3 of the drawings, is simple in form and economical to make. It is designed to embrace and enclose merely the rims and lenses of the spectacles and to provide for the projection of the bows through the ends of the case so that they may be folded over the side of the case to give it the required rigidity, and also to assist in holding it in closed position.

The case consists of a back member 10 and a front member 11 hinged to the back member along the line 12. It will be understood, of course, that these parts may be made integrally, if desired, or may be separate and stitched together along the line 12. The parts are preferably made of leather or imitation leather, or a similar flexible and relatively thin material so that the case will require practically no more room within the pocket than would be occupied by the spectacles themselves. A flap 13 of the same material as the case may be hinged to the member 10 along the line 14, so as to be folded over the front member 11 to completely close the case and prevent the spectacles from slipping out of the mouth between the members 10 and 11. This flap may likewise be integral with the back 10.

The rims 15 are slipped within the case when the latter is in the open position shown in Fig. 2, and the ends of the case are left partially or entirely open so that the bows 16 hinged to the rims at 17 may project through the ends of the case and be folded over the outer flap 13 after the latter has been closed. While in Figs. 1 to 3 of the drawings the ends of the case are shown entirely open, it will be, of course, obvious that the members 10 and 11 may be stitched together for a short distance from their hinged edges so as to provide a shallow pocket. This, however, will not be necessary as when the flap 13 has been folded over the member 11, and the bows folded as shown in Fig. 1, the case will be held closed by the bows and by being within the pocket, so that there will be no danger of the spectacles coming out of the case. Any endwise movement of the spectacles within the case is, of course, prevented by the folded bows, the case being preferably of the proper size to enclose the lenses and extend to a point adjacent the hinges of the bows.

In Figs. 4 to 6 of the drawings, I have shown a slightly modified form of my invention, which consists merely of a back member 20 and a front member 21 hinged together along the line 22 and preferably stitched or otherwise secured together along their edges for a short distance from the hinge, as shown at 23 and 24, so as to provide a shallow pocket in which the rims of the spectacles may be inserted. The upper free edges of the members 20 and 21 are provided with a snap fastener, comprising a socket 25 and a cooperating button 26 by which they may be secured together so as to close this edge of the case after the spectacles have been inserted therein. As already explained in connection with Figs. 1 to 3, the bows will be folded over the outside of the case, the ends being left open for this purpose above the stitched portions 23 and 24. The spectacles, it will be understood, are inserted through the open mouth of the case into the pocket formed by these stitched edges with the bows in open position. The latter will then be folded over the case, which may then be closed by means of the snap fastener.

As has been before stated, the case is preferably made of a relatively thin material so as to occupy as small space as possible in the pocket, and may be made quite flexible as the bows and rims themselves will supply the required rigidity.

It will be obvious that in both forms of my invention disclosed, I have shown a case consisting of front and rear members hinged along one edge and open at the opposite edge to provide a mouth through which the spectacles may be inserted, while the bows are in open position, the bows being thereafter folded over the top member of the case to hold this member closed and to give the case the necessary rigidity.

While I have shown and described some preferred embodiments of my invention, it will be understood that it is not to be limited to all the details shown, but is capable of modification and variation within the spirit of the invention and within the scope of the appended claims.

What I claim is:

1. A spectacle case comprising a rear member, a front member hinged thereto along one side edge thereof and designed to overlie the rear member to form a receptacle, and a flap hinged to the opposite side edge of the rear member and designed to be folded thereover and over the free edge of the second member, the case so formed being left open at the ends for the projection of the bows of the spectacles therethrough, said case being held in closed position by the folding of the bows over the front thereof.

2. A spectacle case comprising a flexible strip of material folded upon two lines intermediate its length to provide a rear member and two front flap members, the case thus formed being left open at the side edges so that the rims of a pair of spectacles may be inserted between the front flap members and the rear member, with the bows projecting from the open edges, the bows being then folded over the flap members to hold the case closed and supply rigidity to the case.

In witness whereof, I have hereunto set my hand this 21st day of July, 1925.

HAROUTUNE M. DADOURIAN.